No. 757,702.

Patented April 19, 1904.

UNITED STATES PATENT OFFICE.

GEORG WICHMANN, OF BERLIN, GERMANY, ASSIGNOR, BY DIRECT AND MESNE ASSIGNMENTS, TO CHEMISCHE FABRIK AUF ACTIEN, (VORM. E. SCHERING,) OF BERLIN, GERMANY, AND SOCIÉTÉ CHIMIQUE DES USINES DU RHONE, (ANCIENNEMENT GILLIARD, P. MONNET ET CARTIER,) OF ST. FONS, NEAR LYONS, FRANCE.

PROCESS OF MAKING ORTHO-OXY-CARBON ACIDS.

SPECIFICATION forming part of Letters Patent No. 757,702, dated April 19, 1904.

Application filed March 19, 1901. Serial No. 51,925. (No specimens.)

*To all whom it may concern:*

Be it known that I, GEORG WICHMANN, a subject of the King of Prussia, Emperor of Germany, residing in Müllerstrasse 170/71, Berlin, Germany, have invented a Process of Producing Ortho-Oxy-Carbon Acids, of which the following is a specification.

The object of my invention is to produce ortho-oxy-carbon acids in great purity and with a better yield than by former methods; and this object I attain by subjecting to carbonic-acid treatment a mixture of the alkaline salt of a phenol with sulfite.

The term "phenol" is here used in a sufficiently broad sense to comprise not only phenol as such (carbolic acid) and its homologues, but also, for example, the naphthols and the like.

An addition of one part, by weight, of, for example, crystallized sodium sulfite to ten parts, by weight, of phenol has proved sufficient for the purpose. The mixture is made most conveniently by uniting a concentrated solution of the sodium sulfite with soda-lye and pouring liquid phenol into this mixture.

To produce salicylic acid, the following procedure may be followed, for example: A concentrated aqueous solution of 9.4 kilograms of crystallized sodium sulfite is mixed with one hundred kilograms of forty per cent. soda-lye. To this mixture are added, while stirring, ninety-four kilograms of phenol (carbolic acid) and then is evaporated to dryness while stirring, preferably in a vacuum evaporating apparatus. This mixture is then converted into sodium salicylate by means of carbonic acid (carbon dioxid) in the known way, and then the salicylic acid is separated and purified in the usual way.

An analogous procedure is followed to produce ortho and para cresotin acid, alpha and beta oxy-naphthoic acid by starting with corresponding quantities of ortho or para cresol or alpha or beta naphthol. The mixture of sodium phenol and sodium sulfite may also be produced by mixing dry sodium phenolate or sodium cresolate (ortho or para) or sodium naphthalate (alpha or beta) with anhydrous sodium sulfite.

Instead of the sodium combinations the corresponding quantities of potassum combinations may everywhere be used, and instead of sodium or potassium sulfite other suitable sulfites may be used.

For example, instead of producing a mixture of the alkaline phenol and a sulfite in the manner described when producing salicylic acid it is advantageous to use the mixture of alkaline phenol and alkaline sulfite, resulting from the synthetic production of phenol from benzol-sulfo-acid alkali by fusing with caustic alkali. The reaction will be according to the following equation:

To produce salicylic acid, for example, the following is the procedure: A fused mass prepared in the usual manner of two hundred kilograms benzene-sulfo-acid soda and the necessary quantity of caustic soda is brought in a hot state on an iron plate and reduced to powder after cooling. This powder, if desired, after saturating an excess of caustic sodium with phenol or another suitable acid is then converted into sodium salicylate in the known way by treatment with carbonic acid, and the salicylic acid is obtained from the sodium salicylate in the usual manner. Instead of employing the mixture directly it may be mixed with about three hundred to four hundred liters of water, in which a part of the sulfite will remain undissolved and can then be removed. The concentrated solution of sodium phenol and alkaline sulfite is then either evaporated to dryness and treated with carbonic acid, or the solution, in order to use up the surplus soda which may be still present, is mixed with as much phenol as it is still able to take up, and then the mixture is evaporated to dryness and finally subjected to the carbonic-acid treatment. Other ortho-oxy-carbon acids—such as ortho and para cresotin acid, alpha and beta oxy-naphthoic acid—may also be obtained in the like manner, toluol-sulfo-acid soda or naphthalin-sulfo-acid soda being mixed with the requisite quantity of caustic soda and the mixture then treated further in the manner described for producing salicylic acid.

In the mixtures salts of potash may be employed instead of soda salts, and caustic potash may be used instead of caustic soda, although the use of soda salts is preferable.

The use of a mixture of sulfite and alkaline phenol has this effect, that the oxidation and coloring of the phenol soda are reduced to a minimum, and consequently the purifying of the ortho-oxy-carbon acids is made much easier, and the yield is increased.

By using the mixture obtained from fusing the alkaline salts of a sulfo-acid of aromatic hydrocarbons with caustic alkali the separation and cleaning of the phenol in question are made unnecessary, and thereby a saving in material and labor is effected. Furthermore, the caustic alkali is saved, which otherwise would be required for the production of phenol alkali from phenol.

I claim as my invention—

1. The process of producing ortho-oxy-carbon acids which consists in reacting with carbon dioxid on a mixture of an alkaline phenolate and a sulfite, and separating from the resulting alkali salt of the ortho-oxy-carbon acid, the ortho-oxy-carbon acid, substantially as described.

2. The process of producing ortho-oxy-carbon acid from a mixture of an alkaline salt of a phenol and a sulfite, said process consisting in treating with carbonic acid a mixture obtained by fusing an alkali salt of a sulfo-acid of aromatic hydrocarbons with caustic alkali and separating from the alkali salt thus obtained the ortho-oxy-carbon acid, substantially as described.

3. The process of producing ortho-oxy-carbon acids from a mixture of an alkali salt of a phenol and a sulfite, said process consisting in treating a mixture obtained by fusing an alkali salt of a sulfo-acid of aromatic hydrocarbons with caustic alkali, from which mixture is separated a portion of the sulfite, with carbonic acid and separating from the alkali salt thus obtained the ortho-oxy-carbon acid, substantially as described.

4. The process of producing ortho-oxy-carbon acids from a mixture of an alkali salt of a phenol and a sulfite, said process consisting in separating from the fused mixture a part of the sulfite by treating the mass with a quantity of water insufficient to completely dissolve the mass and then subjecting the mass to treatment with carbon dioxid and separating out the ortho-oxy-carbon acid.

5. The process of producing salicylic acid, consisting in acting with carbon dioxid on a mixture of alkali phenolate with alkali sulfite and then separating the salicylic acid from the alkaline salt produced, substantially as described.

6. The process of producing salicylic acid, which consists in melting alkali-benzol sulfonate with caustic alkali and reacting with carbon dioxid on said mixture and separating from the resulting alkali salt, the salicylic acid.

7. The process of producing salicylic acid, which consists in melting benzol-sulfonate of alkaline metal with caustic alkali, separating from the resulting mixture of alkali phenolate and alkali sulfite a portion of the latter, then reacting with carbon dioxid on said mixture and separating the salicylic acid from its alkali salt thus produced, substantially as described.

In testimony whereof I have signed my name to this specification in the presence of two subscribing witnesses.

GEORG WICHMANN.

Witnesses:
HENRY HASPER,
WOLDEMAR HAUPT.